July 25, 1950        R. W. SWAIN        2,516,270
PHOTOGRAPHIC ILLUMINATOR
Filed May 8, 1945        2 Sheets-Sheet 1
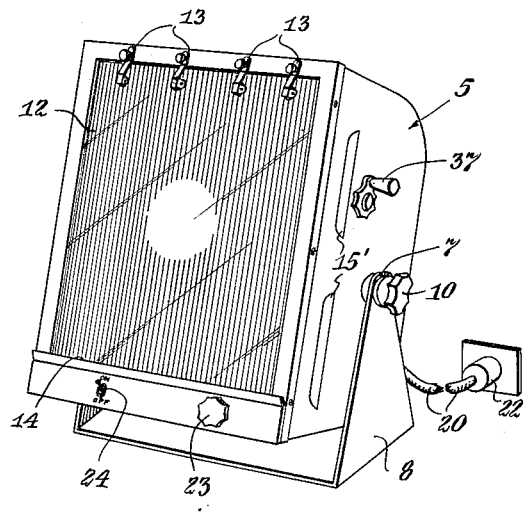
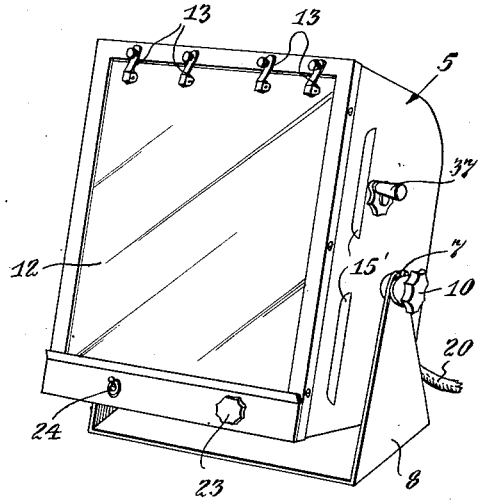
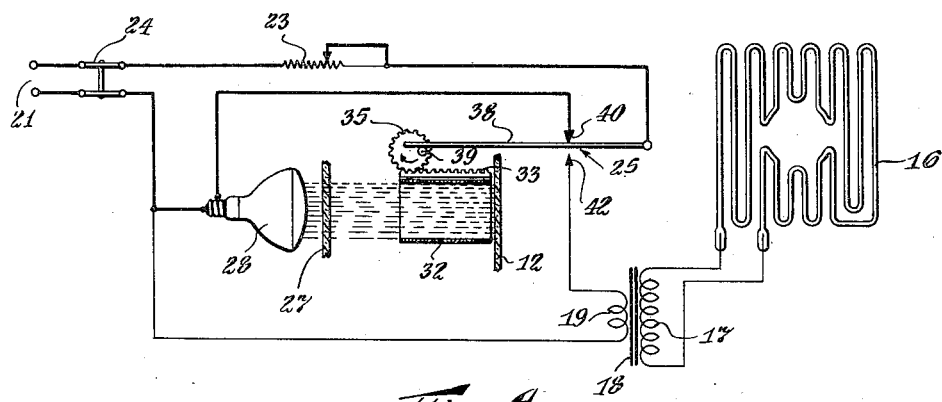
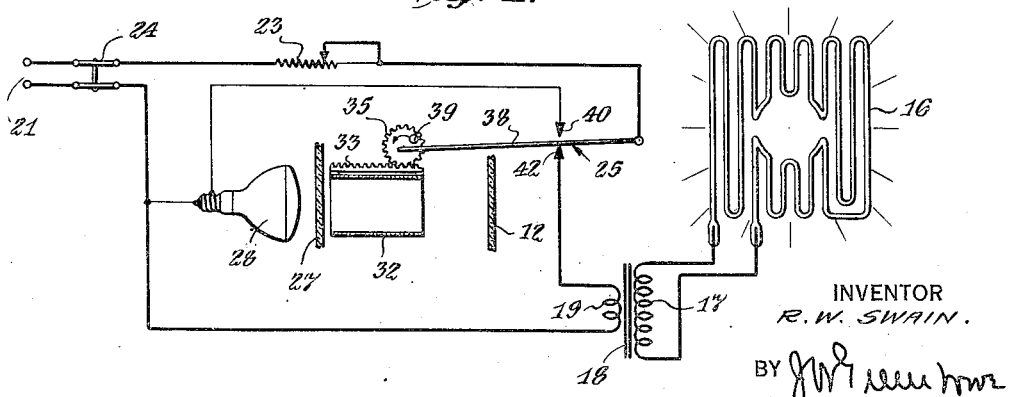
INVENTOR
R. W. SWAIN.
BY
ATTORNEY July 25, 1950  R. W. SWAIN  2,516,270
PHOTOGRAPHIC ILLUMINATOR
Filed May 8, 1945  2 Sheets-Sheet 2

INVENTOR
R. W. SWAIN.
BY
ATTORNEY

Patented July 25, 1950

2,516,270

UNITED STATES PATENT OFFICE 2,516,270

PHOTOGRAPHIC ILLUMINATOR

Robert W. Swain, Baltimore, Md., assignor to Westinghouse Electric Corporation, East Pittsburgh, Pa., a corporation of Pennsylvania Application May 8, 1945, Serial No. 592,665

4 Claims. (Cl. 40—132)

The present invention relates to illuminators or film viewers as customarily utilized to view film negatives and especially X-ray films.

Devices of this kind have long been known to the art wherein the source of illumination is housed within the viewer and the film to be studied is placed against a translucent glass front. In such devices the illumination has heretofore been more or less general over the entire front, but due to the position of the source, the intensity of the illumination has been anything but uniform resulting in certain portions of the film being more difficult to interpret. Moreover, since the wide application of the use of X-rays for industrial inspection and the like with attendant increase in the intensity of the X-rays, which causes increase in the density of the exposed film, it has become desirable to illuminate certain portions of the film or, in other words, to concentrate the illumination at a given location.

It is accordingly an object of the present invention to provide a film viewer wherein the illumination is more uniformly distributed over the entire surface of the front of the viewer.

Another object of the present invention is the provision of a film viewer wherein a spot source of illumination is utilized to concentrate the illumination at a given portion of the film.

Another object of the present invention is the provision of a film viewer wherein the illumination is selectively distributed uniformly over the entire front of the viewer or concentrated in a given spot thereof as desired.

Still further objects of the present invention will become obvious to those skilled in the art by reference to the accompanying drawings wherein:

Figure 1 is a perspective view showing the film viewer of the present invention and depicting it "spot illuminated";

Figure 2 is a perspective view similar to Fig. 1 and showing the film viewer of the present invention and depicting it "uniformly illuminated";

Figure 3 is a schematic illustration of the electrical circuit and showing the circuit energized for "spot illumination";

Figure 4 is a schematic illustration like Fig. 3 but showing the electrical circuit energized for "uniform illumination";

Figure 5:
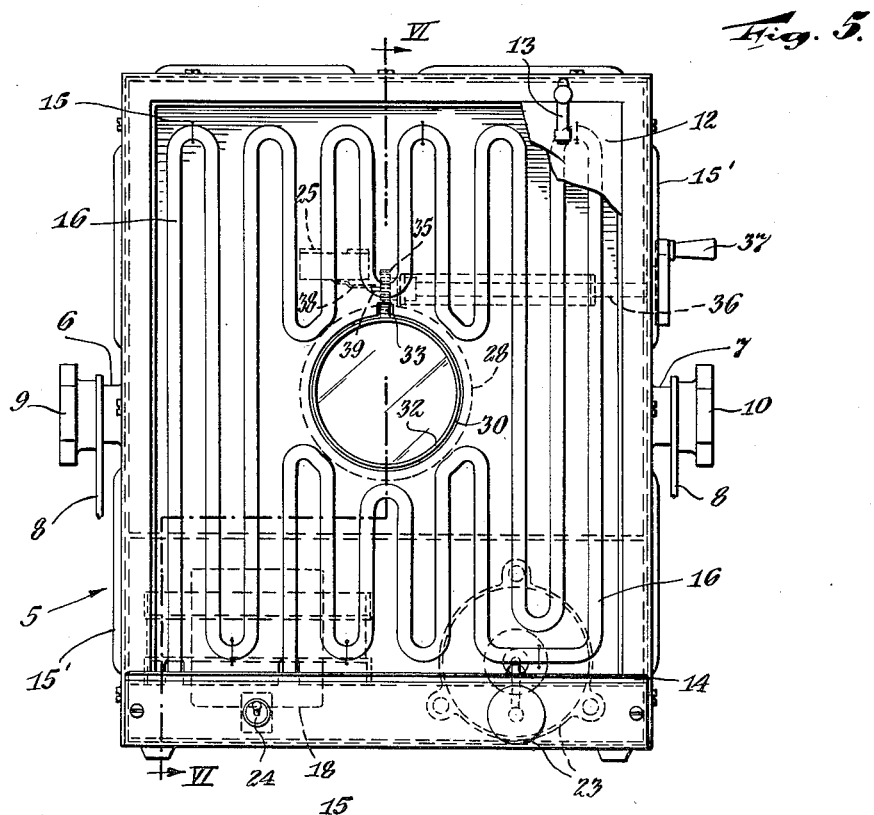
Figure 5 is a front view of the device with the translucent front plate broken away to better illustrate the interior of the device.

Referring now to the drawings in detail, the film viewer, as shown in Figs. 1 and 2, comprises a housing or casing 5 mounted on trunnions 6 and 7 so as to be tiltable about a base 8 through an angle of approximately 110°, and secured at the desired angle by tightening of knobs 9 and 10. The front of the film viewer is provided with a translucent plate of ground or opal glass or the like 12, against which the X-ray film is held by means of spring clips 13 while the bottom of the film rests in a trough or the like 14.

Figure 6:
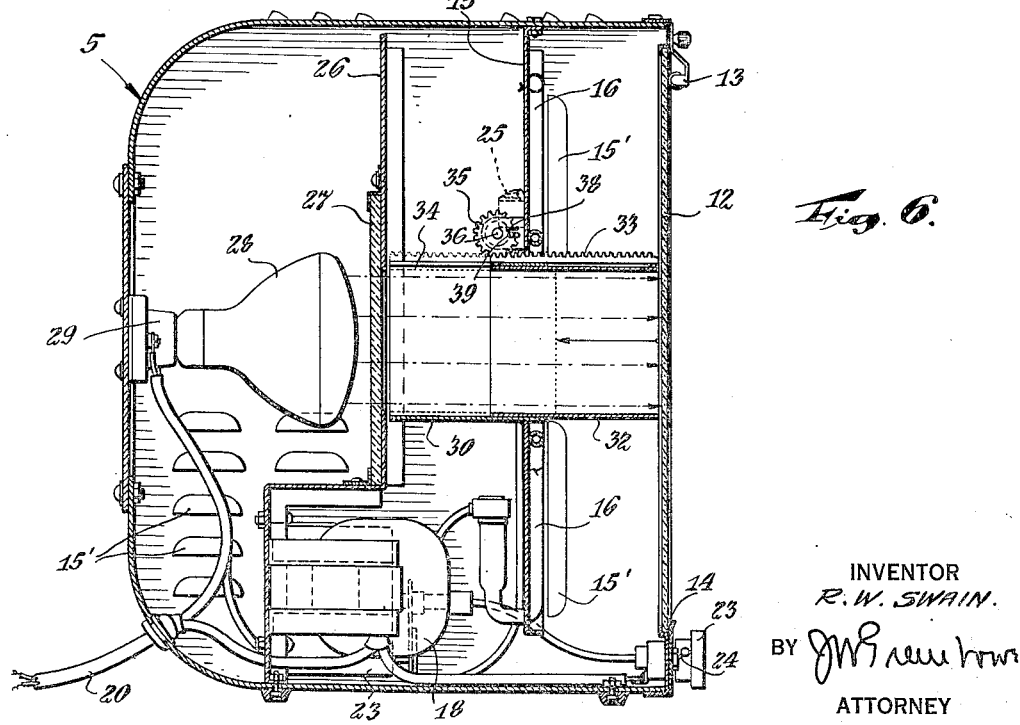
Figure 6 is a sectional view taken on the line VI—VI of Fig. 5.

The housing 5 is provided with louvers 15' to allow the circulation of air interiorly thereof for the purpose of cooling the sources of illumination. As will be seen more clearly from Figs. 5 and 6, the interior of the housing 5 is provided with a light reflecting panel 15 of metal or the like, supported by the housing 5, and which in turn supports a discharge lamp 16 such as the well known type commonly referred to as a fluorescent lamp. This lamp, which is of appreciable length, is so formed as to cover the surface of the panel 15 throughout an area corresponding substantially to the area of the translucent front plate 12 and when illuminated, as hereinafter described, distributes illumination of substantially uniform intensity over the entire front plate 12 as depicted in Fig. 2.

The fluorescent discharge lamp 16, as shown in Fig. 4, has its electrodes connected to the secondary winding 17 of a high voltage transformer 18. The primary winding 19 of this transformer receives energy from the customary source of domestic potential of 115 volts through a connecting cord 20 and plug 22 (Fig. 1) and a variable resistance 23, upon closure of a panel switch 24 and when a series switch 25, as hereinafter described more in detail, is in the position as shown in Fig. 4.

A further heat absorbing panel 26 is supported by the housing 5 with this latter panel having a heat-resisting glass window 27 therein, and an incandescent lamp 28 carried by a socket 29 aligned with the panel window 27 so as to direct a beam of light toward the front plate 12. It will also be noted that the interior panel 15 is provided with a cylindrical member 30 suitably secured thereto and projecting toward the panel 26 with its axis aligning with the beam of light from the incandescent lamp 28, or "spot light," as it will be hereinafter referred to.

Telescopically engaging the cylindrical member 30 is a second or inner cylindrical member 32 provided with a rack bar 33 sliding in a slot 34 provided in the outer cylindrical member 30. In order to cause the inner cylindrical member 32 to move into or out of the outer cylindrical member 30 a pinion 35 engages the rack bar 33 with the pinion being rotatable by a shaft 36 and crank 37 provided on the outside of the housing 5. It will also be noted that the fluorescent discharge lamp 16 is so formed as to provide a clear space so that the inner cylindrical member 32 passes beyond the plane of the fluorescent lamp 16 into close proximity to the rear side of the front plate 12.

The series connected switch 25 is mounted interiorly of the housing 5 and may be of any suitable type such as to be actuated by movement of the cylindrical member 32. As shown, such switch is provided with an actuating arm 38 adapted to be engaged by a detent 39 (Figs. 3 and 4) carried by the pinion 35, the latter of which rotates slightly less than 360° in moving the inner cylindrical member 32 the full length of its travel.

Referring now more specifically to Fig. 3, when the diagnostician or inspector desires to examine a particular portion of an X-ray film, he positions the film on the front plate 12 so as to align the desired portion with approximately the center of the plate 12. Assuming the cord plug 22 is inserted into the customary receptacle outlet, he will then rotate the crank 37 to extend the cylindrical member 32 to its outermost position (unless it is already in such position from prior use). Upon the cylindrical member reaching its extended position, the detent 39 will raise the arm 38 of switch 25 and into engagement with a contact 40 as shown in Fig. 3. The operator then closes switch 24 on the front of the film viewer which energizes the "spot light" 28 through a circuit extending from one side of the supply source through variable resistance 23, which is adjustable from the front of the viewer to give the desired light intensity, then arm 38 and contact 40 of switch 25 to the "spot light" 28 and back to the other side of the supply source, in the manner shown by the heavy lines in Fig. 3. The "spot-light" 28 accordingly projects a beam of illumination on the front plate 12 having an area corresponding to the diameter of the inner cylindrical member 32, as shown in Fig. 1, since such member acts as a shield preventing illumination striking the front plate 12 other than the concentrated spot.

Assuming now it is desired to examine the entire film rather than any particular part, the operator need only rotate the crank 37 to cause the inner cylindrical member 32 to telescope within the outer cylindrical member 30. In doing so, the detent 39 moves away from switch arm 38 allowing it to gravitate away from contact 40 and into engagement with a contact 42 of switch 25. Disengagement of contact 40 thus interrupts the circuit previously mentioned with extinguishment of the "spot light" 28, but when switch arm 38 engages contact 42, a circuit is immediately completed to the primary winding 19 of transformer 18 as shown by the heavy lines of Fig. 4 resulting in the energization of the fluorescent discharge lamp 16 by the secondary winding 17. Again the intensity of the illumination from the lamp 16 is controlled from the front by variable resistance 23 since the latter is common to both circuits. Moreover, since the fluorescent discharge lamp 16, due to its configuration covering an area substantially equal to that of the front plate 12 (even though provided with an opening for passage of the cylindrical member 32), the intensity of the illumination is distributed uniformly over the entire surface area of the front plate 12.

It thus becomes obvious to those skilled in the art that a film viewer is herein provided in which the illumination may be selectively distributed uniformly over the entire area of the front plate or concentrated within a preselected spot or portion of such area at the will of the operator.

Although one specific embodiment of the present invention has been shown and described, it is to be understood that still further modification thereof may be made without departing from the spirit and scope of the appended claims.

I claim:

1. A photographic illuminator for viewing films comprising an opaque casing, a translucent window provided in said casing, means for supporting a film in front of said translucent window, a concentrated source of illumination in said casing with the axis of its light beam disposed perpendicular to said translucent window, an adjustable shield for preventing illumination from said concentrated source from striking said translucent window except over a portion of its area corresponding to the area of said shield adjacent to said window, and means operable by movement of said adjustable shield to cause energization of said source of illumination.

2. A photographic illuminator for viewing films comprising an opaque casing, a translucent window provided in said casing, means for supporting a film in front of said translucent window, a source of illumination in said casing disposed in a plane parallel to that of said translucent window and covering an area substantially approximating that of said translucent window for uniformly illuminating the latter over its entire area, a concentrated source of illumination in said casing with the axis of its light beam disposed perpendicular to said translucent window for confining the illumination therefrom to a selected portion of said window, and means operable to selectively cause the energization of one or the other of said sources of illumination.

3. A photographic illuminator for viewing films comprising an opaque casing, a translucent window provided in said casing, means for supporting a film in front of said translucent window, a source of illumination in said casing disposed in a plane parallel to that of said translucent window and covering an area substantially approximating that of said translucent window for uniformly illuminating the latter over its entire area, a concentrated source of illumination in said casing with the axis of its light beam disposed perpendicular to said translucent window, an adjustable shield movable into a position in front and in back of the plane of said first mentioned source of illumination to prevent illumination from said concentrated source from striking said translucent window except over a portion of its area corresponding to the area of said shield adjacent said translucent window, and a switch operable by movement of said shield into a position in front of said first mentioned source of illumination and adjacent to said translucent window to cause closure of an electrical circuit to said concentrated source, and operable to close a circuit to said first mentioned source upon movement of said shield in back of the plane of the latter.

4. A photographic illuminator for viewing films comprising an opaque casing, a translucent window provided in said casing, means for supporting a film in front of said translucent window, a source of illumination in said casing disposed in a plane parallel to that of said translucent window and covering an area substantially approximating that of said translucent window for uniformly illuminating the latter over substantially its entire area, a concentrated source of illumination in said casing with the axis of its light beam disposed perpendicular to said translucent window, and a shield movable toward and away from said translucent window and on each side of the plane of said first mentioned source of illumination for preventing illumination from said concentrated source from striking said translucent window except within the confines of said shield.

ROBERT W. SWAIN.

REFERENCES CITED

The following references are of record in the file of this patent:

UNITED STATES PATENTS

| Number | Name | Date |
|---|---|---|
| 1,201,670 | Witz | Oct. 17, 1916 |
| 1,826,389 | Fullerton | Oct. 6, 1931 |
| 1,846,533 | Thompson | Feb. 23, 1932 |
| 1,891,498 | Borden | Dec. 20, 1932 |
| 1,940,580 | Caddy et al. | Dec. 19, 1933 |
| 1,988,654 | Haag | Jan. 22, 1935 |
| 1,989,803 | Hoben | Feb. 5, 1935 |
| 2,068,360 | Van Deventer et al. | Jan. 19, 1937 |
| 2,239,032 | Boch | Apr. 22, 1941 |
| 2,297,781 | Korengold | Oct. 6, 1942 |

FOREIGN PATENTS

| Number | Country | Date |
|---|---|---|
| 174,799 | Great Britain | Feb. 2, 1922 |